(12) United States Patent
Molenaar et al.

(10) Patent No.: US 6,200,082 B1
(45) Date of Patent: Mar. 13, 2001

(54) ROLLING FLOOR FOR A TRUCK OR TRAILER BOX

(76) Inventors: Mark Molenaar, 78643 County Rd. 6, Renville, MN (US) 56284; Jay Johnson, R.R. 2 Box 78, Olivia, MN (US) 56277

( * ) Notice: Subject to any disclaimer, the term of this patent is extended or adjusted under 35 U.S.C. 154(b) by 0 days.

(21) Appl. No.: 09/360,086

(22) Filed: Jul. 23, 1999

(51) Int. Cl.[7] ........................................ B60P 1/36
(52) U.S. Cl. .......................... 414/528; 198/497; 239/672
(58) Field of Search .................. 414/527, 528, 414/519; 198/497, 498, 499; 239/672, 676

(56) References Cited

U.S. PATENT DOCUMENTS

| 3,593,864 | * | 7/1971 | Moser | 414/528 |
|---|---|---|---|---|
| 3,937,338 | * | 2/1976 | Cox | 414/528 |
| 4,202,437 | * | 5/1980 | Gordon | 198/497 |
| 4,790,715 | * | 12/1988 | Alexander | 414/528 X |
| 4,844,684 | * | 7/1989 | Bradley | 414/528 |
| 4,968,211 | * | 11/1990 | Compton | 414/528 X |
| 5,102,285 | * | 4/1992 | Gust | 414/528 |
| 5,118,244 | * | 6/1992 | Cook | 414/528 |
| 5,207,551 | * | 5/1993 | Yelton | 414/528 |

FOREIGN PATENT DOCUMENTS

| 3901895 | * | 7/1990 | (DE) | 414/528 |
|---|---|---|---|---|
| 2625644 | * | 7/1989 | (FR) | 414/528 |

* cited by examiner

Primary Examiner—Frank E. Werner

(57) ABSTRACT

A rolling floor for a truck or trailer box for hauling, then unloading objects. The rolling floor for a truck or trailer box includes a floor portion and a pair of wall portions upwardly extending from lateral sides of said floor portion. The floor portion has a plurality of rollers extending thereacross. An endless belt wraps around the floor portion and rests on the rollers of the floor portion. A drive mechanism drives the belt.

4 Claims, 3 Drawing Sheets

ROLLING FLOOR FOR A TRUCK OR TRAILER BOX

BACKGROUND OF THE INVENTION

1. Field of the Invention

The present invention relates to live bottom trailers and more particularly pertains to a new rolling floor for a truck or trailer box for hauling, then unloading objects.

2. Description of the Prior Art

The use of live bottom trailers is known in the prior art. More specifically, live bottom trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,317,066; U.S. Pat. No. 3,937,338; U.S. Pat. No. 5,118,244, U.S. Pat. No. 4,441,848; U.S. Pat. No. 2,916,169; U.S. Pat. No. 3,487,905; U.S. Pat. No. 4,055,265; U.S. Pat. No. 3,593,864; U.S. Pat. No. 3,448,876; U.S. Pat. No. 2,507,252; U.S. Pat. No. 4,664,583; U.S. Pat. No. 3,481,647; and U.S. Pat. No. 5,210,921.

While these devices fulfill their respective, particular objectives and requirements, the aforementioned patents do not disclose a new rolling floor for a truck or trailer box which uses a continuous one-piece belt, supported by rollers to reduce friction, driven by a wrap-style hydraulic driven traction wheel positioned under the trailer. Rather, the inventions disclosed in the prior art primarily depend upon chain drives or have a plastic floor. The drawbacks of using chain drives include broken chains, chains becoming disattached from the gears, and the risks of injury from clothing and hair becoming caught in the gears. The main drawback of using the plastic floor model is that a heavy load placed on the belt creates immense friction, which could "freeze" the belt to the floor.

In these respects, the rolling floor for a truck or trailer box according to the present invention substantially departs from the conventional concepts and designs of the prior art, and in so doing provides an apparatus primarily developed for the purpose of hauling, then unloading objects.

SUMMARY OF THE INVENTION

In view of the foregoing disadvantages inherent in the known types of live bottom trailers now present in the prior art, the present invention provides a new rolling floor for a truck or trailer box construction wherein the same can be utilized for hauling, then unloading objects.

The general purpose of the present invention, which will be described subsequently in greater detail, is to provide a new rolling floor for a truck or trailer box apparatus and method which has many of the advantages of the live bottom trailers mentioned heretofore and many novel features that result in a new rolling floor for a truck or trailer box which is not anticipated, rendered obvious, suggested, or even implied by any of the prior art live bottom trailers, either alone or in any combination thereof.

To attain this, the present invention generally comprises a floor portion and a pair of wall portions upwardly extending from lateral sides of said floor portion. The floor portion has a plurality of rollers extending thereacross. An endless belt wraps around the floor portion and rests on the rollers of the floor portion. A drive mechanism drives the belt.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rolling floor for a truck or trailer box apparatus and method which has many of the advantages of the live bottom trailers mentioned heretofore and many novel features that result in a new rolling floor for a truck or trailer box which is not anticipated, rendered obvious, suggested, or even implied by any of the prior art live bottom trailers, either alone or in any combination thereof.

It is another object of the present invention to provide a new rolling floor for a truck or trailer box which may be easily and efficiently manufactured and marketed.

It is a further object of the present invention to provide a new rolling floor for a truck or trailer box which is of a durable and reliable construction.

An even further object of the present invention is to provide a new rolling floor for a truck or trailer box which is susceptible of a low cost of manufacture with regard to both materials and labor, and which accordingly is then susceptible of low prices of sale to the consuming public, thereby making such rolling floor for a truck or trailer box economically available to the buying public.

Still yet another object of the present invention is to provide a new rolling floor for a truck or trailer box which provides in the apparatuses and methods of the prior art some of the advantages thereof, while simultaneously overcoming some of the disadvantages normally associated therewith.

Still another object of the present invention is to provide a new rolling floor for a truck or trailer box for hauling, then unloading objects.

Yet another object of the present invention is to provide a new rolling floor for a truck or trailer box which includes a floor portion and a pair of wall portions upwardly extending from lateral sides of said floor portion. The floor portion has a plurality of rollers extending thereacross. An endless belt wraps around the floor portion and rests on the rollers of the floor portion. A drive mechanism drives the belt.

Still yet another object of the present invention is to provide a new rolling floor for a truck or trailer box in which the belt engages about 75% of the surface area of the drive wheel to ensure that no slipping will occur.

Even still another object of the present invention is to provide a new rolling floor for a truck or trailer box that has the drive system positioned under the trailer rather than mounted on the front or rear of the trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
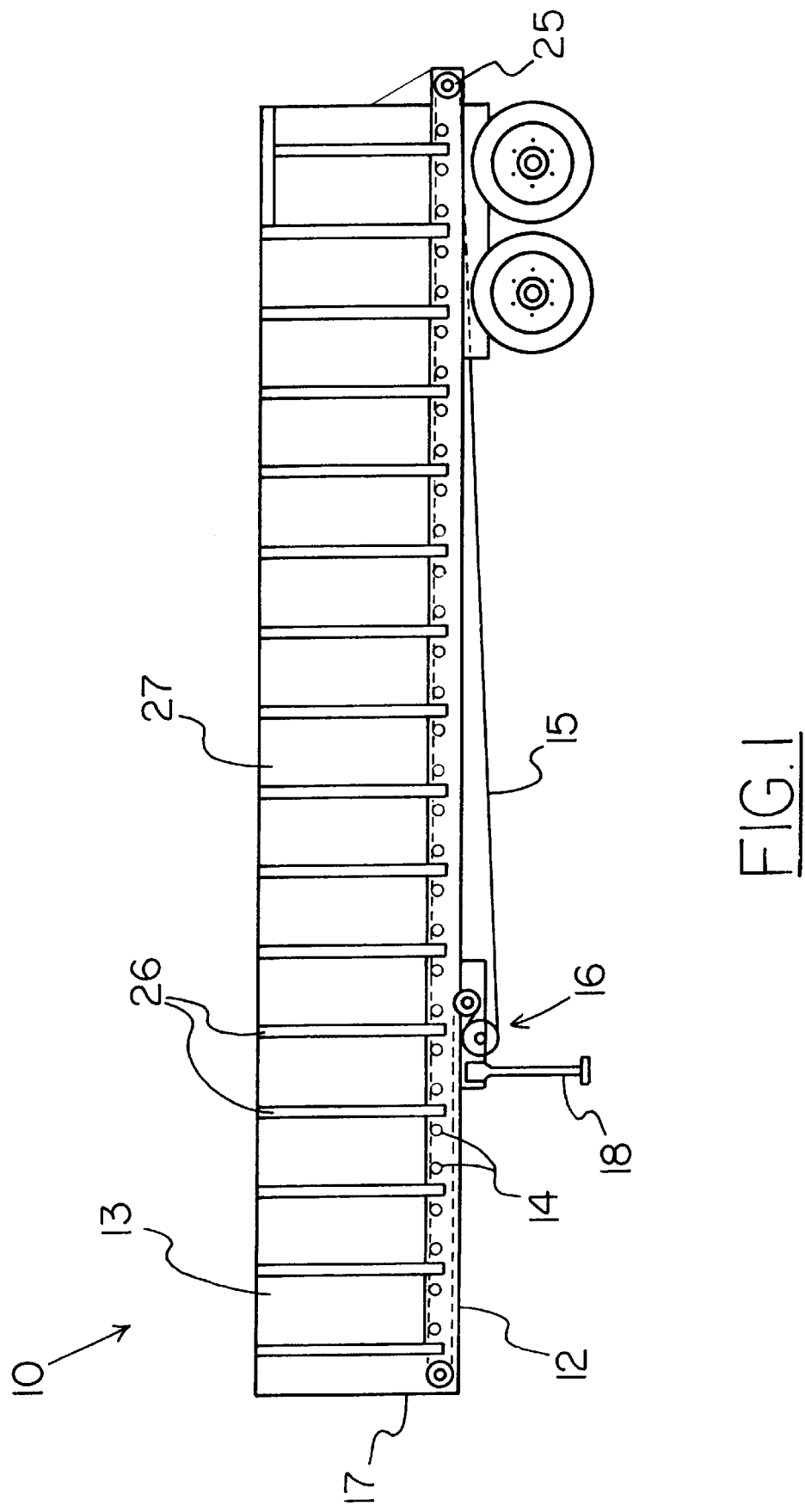
FIG. 1 is a schematic side view of a new rolling floor for a truck or trailer box according to the present invention.

With reference now to the drawings, and in particular to FIGS. 1 through 4 thereof, a new rolling floor for a truck or trailer box embodying the principles and concepts of the present invention and generally designated by the reference numeral 10 will be described.

As best illustrated in FIGS. 1 through 4, the rolling floor for a truck or trailer box 10 generally comprises a floor portion 12 and a pair of wall portions 13 upwardly extending from lateral sides of the floor portion. The floor portion has a plurality of rollers 14 extending thereacross. An endless belt 15 wraps around the floor portion and rests on the rollers of the floor portion. A drive mechanism 16 drives the belt.

Preferably, the rollers are each about as long as the floor portion is wide. The preferred outer diameter of each of the rollers is about 4 inches.

Also preferably, the drive mechanism is positioned under the floor portion at a point between about ⅛ and ½ the length of the trailer from the front 17 of the trailer. This positioning provides many advantages over front or rear mounting of the drive mechanism in that space does not have to be reserved in the front of the trailer for the drive mechanism; nor does the drive mechanism depend from the back where it would take up an inconvenient amount of space and could be damaged when backing over docking ledges. The ideal position of the drive mechanism is immediately behind the support arms 18 of the trailer so that it may be protected from debris and water kicked up by the wheels of a truck pulling the trailer. For example, a panel (not shown) may extend between the support arms in front of the drive mechanism.

Preferably, the drive mechanism comprises a traction wheel 19, an idler wheel 20 positioned horizontally beside the traction wheel, and a rotating mechanism (not shown) for rotating the traction wheel. This configuration, best shown in FIG. 4, minimizes the profile of the drive mechanism. The belt wraps around the traction and idler wheels in a generally S-shaped manner.

The belt should contact at least 70%, ideally at least 75%, of the traction wheel, which prevents slippage of the belt with respect to the traction wheel, especially when attempting to move a heavy load along the trailer.

Preferably, the idler wheel is biased away from the traction wheel to keep the belt tight against the traction wheel. Also preferably, the rotation mechanism comprises a hydraulic drive such as a turbine which is rotated by hydraulic fluid passing through it. This permits more controlled moving of the belt in that as the fluid moves faster, the belt will slowly begin to move rather than jerk forward as it would with a chain or geared drive.

Also preferably, a first wiper blade 21 is provided for wiping an outer surface 22 of the belt. A second wiper blade 23 may also be provided to wipe an inner surface 24 of the belt. The first and second wipers should be positioned towards the drive mechanism to remove any water or dirt from the belt before it engages the drive mechanism, particularly useful after driving in rain. A third wiper 25 may be positioned towards a rear of the floor portion for wiping an outer surface of the belt so that water and dirt on the belt are less likely to be carried into the trailer when the belt is running in reverse (i.e., to carry objects into the trailer).

Preferably, each of the wall portions has a plurality of equally spaced ribs 26 and a wall 27 coupled to inner surfaces of the ribs. Each of the ribs may have a lower member 28 coupled to the floor portion and oriented at an obtuse angle, ideally about 135 degrees, from the bottom portion and an upper member 29 extending generally vertically from the lower member. This configuration reduces the width of the floor portion, and thus the belt, thereby considerably reducing cost of manufacture as well as reducing any tendency of the belt to deform under uneven load conditions. In such a configuration, the width of the belt would be about 44 inches.

Preferably, each of the lower members of the ribs has a support portion 30 extending from an inner surface thereof for positioning the wall above outer edges of the belt so that everything in the trailer will slide towards and onto the belt without risk of anything slipping between the belt and the floor portion. A pair of flaps 31 could also downwardly extend from a lower edges of the walls to slidably engage the belt to provide an added measure of protection, and which would be required when small objects such as grains are being transported.

Figure 2:
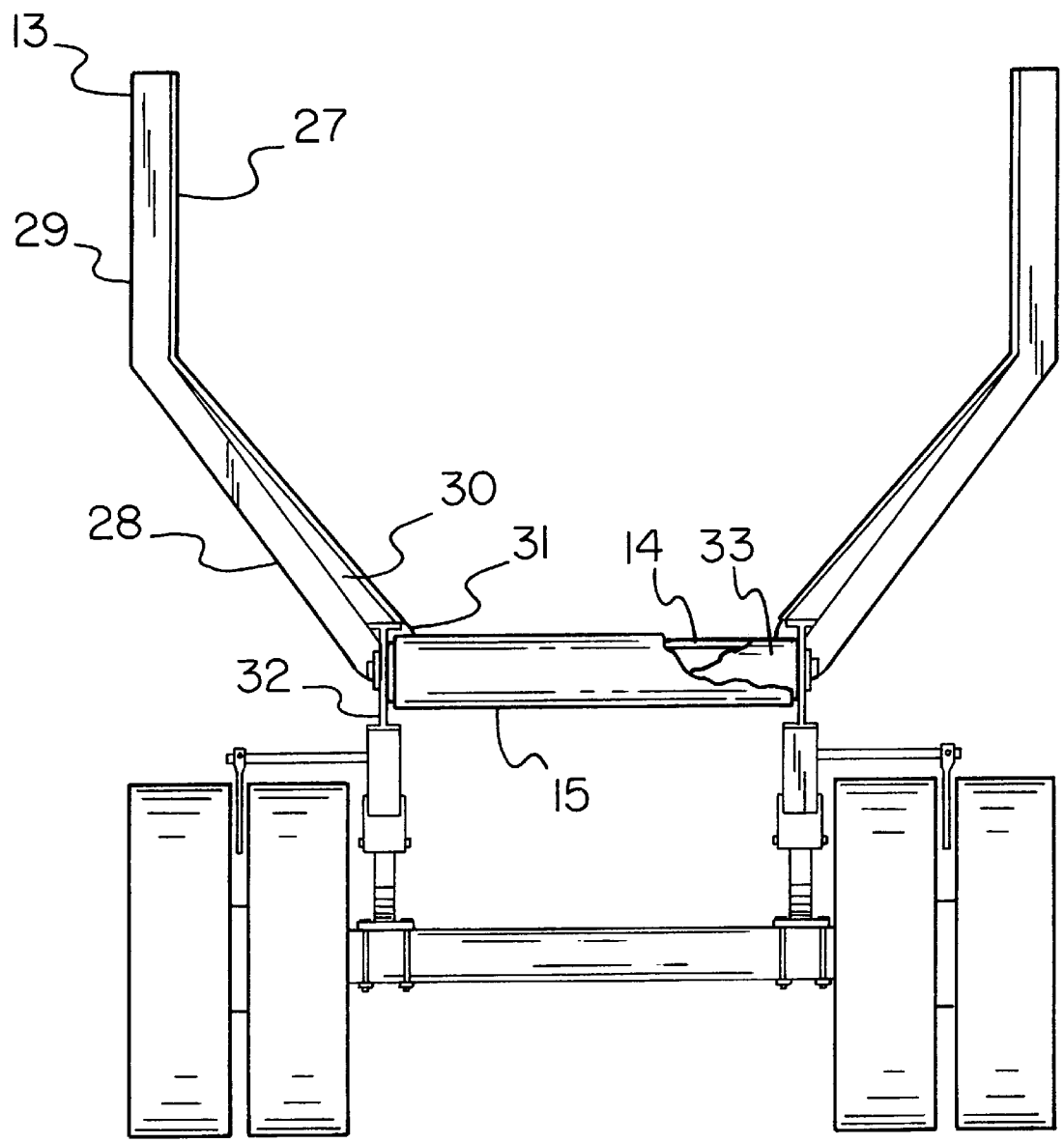
FIG. 2 is a schematic rear view of the present invention.
Figure 3:
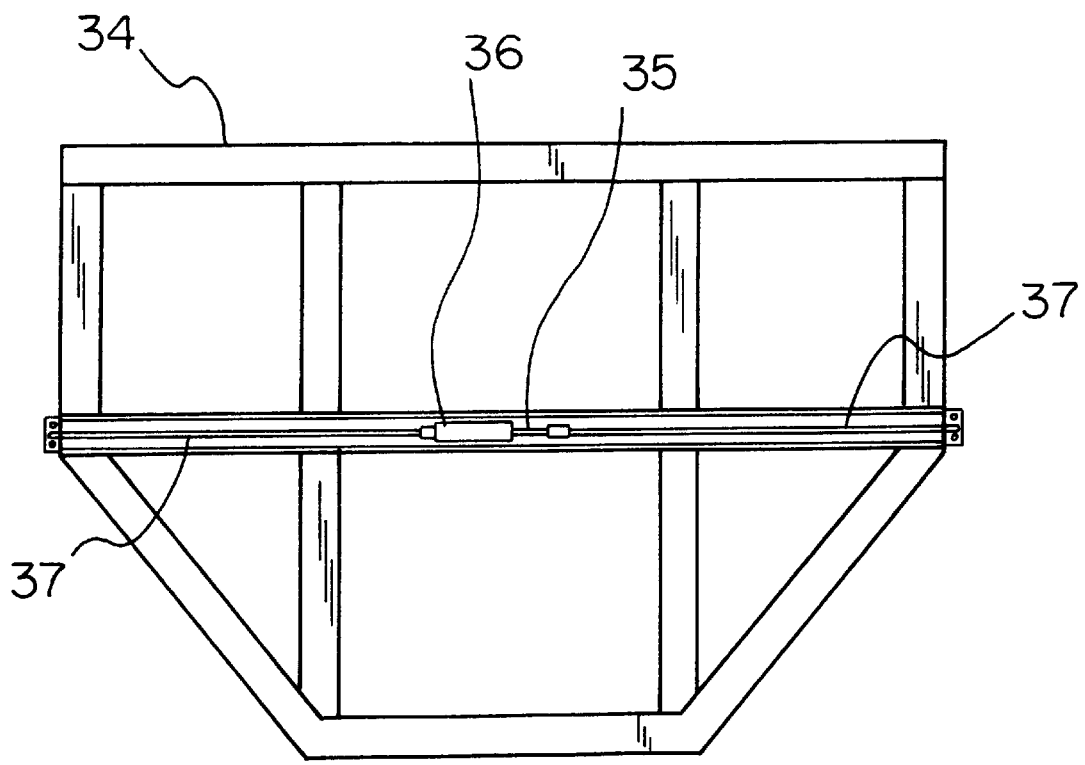
FIG. 3 is a schematic rear view of the end gate of present invention.
Figure 4:
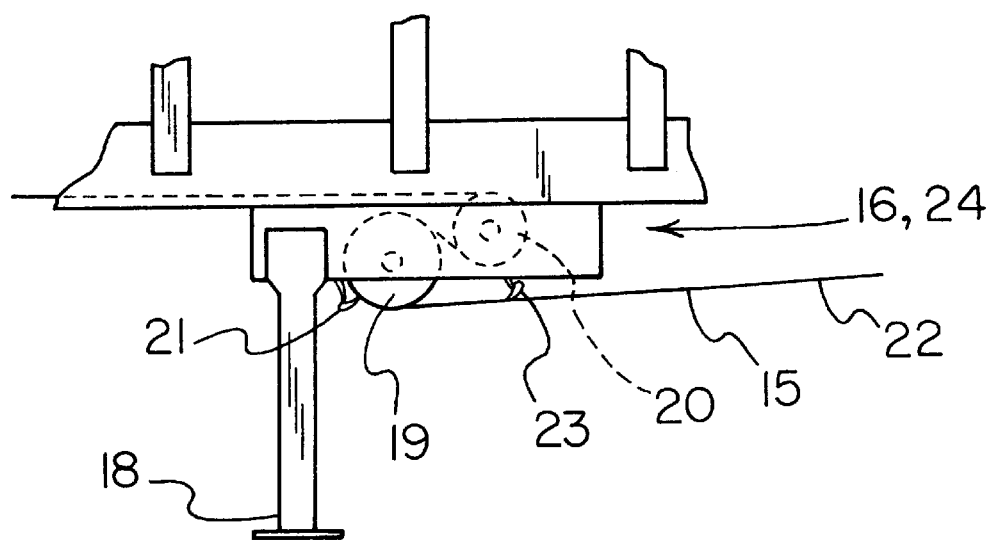
FIG. 4 is a schematic detailed view of the drive system of the present invention.

As shown in FIG. 2, the support portions are coupled to I-beams 32 to form the skeleton of the trailer. The ribs can either extend through channels cut into the tops of the I-beams or can be fastened directly to them.

The trailer may also be closed (i.e., have a roof) and be of different shapes, such as having, a substantially rectangular cross section taken perpendicular to the longitudinal axis of the floor portion.

Guide rollers 33 at the front and back of the floor portion help the belt wrap around the floor portion. Ideally, each of the guide rollers has an outer diameter of about 8 inches.

A gate 34 is pivotally coupled to the wall portions and has a latch mechanism including a piston 35 and cylinder 36 each with a rod 37 extending therefrom that has tapered ends engaging frusto-conical apertures in the wall portions. The piston and cylinder may be driven by air or hydraulic fluid. An alternative to the piston and cylinder could be an electric actuator.

An optional housing (not shown) of a type known in the art may enclose the exposed portions of the belt to protect the belt from dirt and tire spray which could be carried into the trailer as the belt circulates about the floor portion.

In use, objects are placed in the trailer where they rest on the belt. When unloading of the objects is desired, the belt is rotated in a first direction to dump the objects from the back of the trailer. The belt may also be used to assist in loading objects from the back of the trailer. In such case the belt would be rotated in a second direction opposite the first direction to carry objects towards the front of the trailer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A trailer, comprising:

a floor portion and a pair of wall portions upwardly extending from lateral sides of said floor portion, said floor and wall portions each having a forward end and a rearward end;

said floor portion including a plurality of rollers, said plurality of rollers including a pair of end rollers each being positioned toward one of the ends of said floor portion;

an endless belt extending about said floor portion such that an upper extent of said belt extends above said floor portion and a lower extent of said belt extends below said floor portion, said upper extent resting on said rollers of said floor portion, a drive mechanism for driving said belt;

said drive mechanism being positioned under said floor portion at a location adjacent to a pair one support arms extending downwardly with respect to said floor portion;

said drive mechanism comprising a traction wheel, an idler wheel positioned horizontally beside said traction wheel, and a rotation mechanism for rotating said traction wheel, the lower extent of said endless belt comprising a first lower extent extending between a first one of said end rollers and said idler wheel and a second lower extent extending between a second one of said end rollers and said traction wheel, and a return extent extending between said idler wheel and said traction wheel such that said belt wraps around said traction and idler wheels in a generally S-shaped manner for maximizing power transfer from said traction wheel to said endless belt by minimizing slippage therebetween;

wherein said belt contacts at least 70% of a circumference of said traction wheel;

wherein said idler wheel is biased in a direction away from said traction wheel for keeping said belt tight against said traction wheel;

wherein said idler wheel is located toward the rearward end of said floor portion with respect to said traction wheel, and said traction wheel is located toward the forward end of said floor portion with respect to said idler wheel;

wherein said rotation mechanism comprises a hydraulic drive;

a first wiper blade for wiping an outer surface of said belt, said first wiper blade being positioned adjacent to said traction wheel for abutting a portion of said endless belt wrapped about said traction wheel;

a second wiper blade for wiping an inner surface of said belt;

a third wiper positioned towards a rear of said floor portion for wiping the outer surface of said belt;

each of said wall portions having a plurality of equally spaced ribs and a wall coupled to said ribs;

each of said ribs having a lower member coupled to said floor portion and oriented at an obtuse angle from said bottom portion and an upper member extending generally vertically from said lower member;

each of said lower members of said ribs having a support portion extending from an inner surface thereof for positioning said wall above outer edges of said belt; and a gate pivotally coupled to said wall portions and having a latch mechanism including a piston and cylinder each having a rod extending therefrom, each rod having tapered ends engaging frusto-conical apertures in said wail portions.

2. The trailer of claim 12 wherein said floor portion has a length and wherein said drive mechanism is positioned at a location point between about 1/8 and 1/2 of the length of said floor portion rearward from the forward end of the floor portion.

3. The trailer of claim 1 wherein each of said rollers has a length approximately equal to a width of the floor portion.

4. The trailer of claim 1 wherein said endless belt contacts approximately 75% of the circumference of the traction wheel.

* * * * *